US008842963B2

(12) United States Patent
Wysocki et al.

(10) Patent No.: US 8,842,963 B2
(45) Date of Patent: Sep. 23, 2014

(54) REDUCING REFLECTION AT TERMINATION OF OPTICAL FIBER IN A SMALL VOLUME

(75) Inventors: Paul F. Wysocki, Blacksburg, VA (US);
Alan Heaney, Blacksburg, VA (US);
Stephen Kreger, Blacksburg, VA (US);
Mark Froggatt, Blacksburg, VA (US);
Ken Walker, Semora, NC (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 49 days.

(21) Appl. No.: 13/222,577

(22) Filed: Aug. 31, 2011

(65) Prior Publication Data

US 2012/0057841 A1    Mar. 8, 2012

Related U.S. Application Data

(60) Provisional application No. 61/379,116, filed on Sep. 1, 2010.

(51) Int. Cl.
*G02B 6/00* (2006.01)
(52) U.S. Cl.
USPC ............. 385/139; 385/76; 359/888; 359/890; 606/15; 606/16
(58) Field of Classification Search
CPC ......... G02B 6/241; G02B 6/243; G01L 7/106
USPC ................................... 385/139; 65/406, 412
See application file for complete search history.

(56) References Cited

U.S. PATENT DOCUMENTS

| | | | | |
|---|---|---|---|---|
| 4,834,493 A | * | 5/1989 | Cahill et al. | 385/77 |
| 4,998,795 A | * | 3/1991 | Bowen et al. | 385/78 |
| 5,048,908 A | | 9/1991 | Blonder et al. | |
| 5,091,244 A | * | 2/1992 | Biornard | 428/216 |

(Continued)

FOREIGN PATENT DOCUMENTS

| | | | | |
|---|---|---|---|---|
| JP | 57046207 A | * | 3/1982 | |
| JP | 01068703 A | * | 3/1989 | |

(Continued)

OTHER PUBLICATIONS

International Search Report and Written opinion mailed Mar. 28, 2012 in corresponding Application No. PCT/US2011/049934.

(Continued)

*Primary Examiner* — Mark Robinson
*Assistant Examiner* — Peter Radkowski
(74) *Attorney, Agent, or Firm* — Nixon & Vanderhye P.C.

(57) ABSTRACT

A method and structure for terminating an optical fiber are disclosed that provide an optical fiber termination structure with a small volume and very low return loss, even when the termination is in close proximity to reflective surfaces. In one example embodiment, the optical fiber termination reduces reflections into the one or more cores to a return loss of −70 dB or less regardless of the presence of surfaces proximate the optical fiber termination. At the same time, a length of the optical fiber termination is less than 5 mm and a largest transverse dimension of the optical fiber termination is less than 325 um. The optical fiber termination is useful in fiber sensing applications in general and is particularly effective for terminating a multi-core fiber used in a distributed shape sensing application.

25 Claims, 7 Drawing Sheets

(56) References Cited

U.S. PATENT DOCUMENTS

| | | | |
|---|---|---|---|
| 5,196,005 A * | 3/1993 | Doiron et al. | 606/7 |
| 5,253,312 A | 10/1993 | Payne et al. | |
| 5,263,103 A * | 11/1993 | Kosinski | 385/31 |
| 5,270,854 A * | 12/1993 | Lee et al. | 359/359 |
| 5,337,337 A | 8/1994 | Aoyama et al. | |
| 5,337,377 A * | 8/1994 | Yamada et al. | 385/15 |
| 5,415,655 A * | 5/1995 | Fuller et al. | 606/16 |
| 5,530,780 A * | 6/1996 | Ohsawa | 385/31 |
| 5,546,486 A * | 8/1996 | Shih et al. | 385/31 |
| 5,757,993 A * | 5/1998 | Abe | 385/34 |
| 5,809,198 A * | 9/1998 | Weber et al. | 385/139 |
| 5,830,812 A * | 11/1998 | Shelestak et al. | 501/71 |
| 6,496,643 B1 | 12/2002 | Gonthier et al. | |
| 6,643,447 B2 * | 11/2003 | Guy et al. | 385/139 |
| 7,099,552 B1 * | 8/2006 | Oron et al. | 385/139 |
| 7,389,024 B2 * | 6/2008 | Oron et al. | 385/38 |
| 2001/0017971 A1 * | 8/2001 | Iwata et al. | 385/139 |
| 2002/0186921 A1 * | 12/2002 | Schumacher et al. | 385/31 |
| 2003/0002844 A1 * | 1/2003 | DeRosa et al. | 385/139 |
| 2003/0077056 A1 * | 4/2003 | Caron | 385/123 |
| 2004/0101258 A1 * | 5/2004 | Aronson et al. | 385/92 |
| 2007/0127870 A1 * | 6/2007 | Oron et al. | 385/38 |

FOREIGN PATENT DOCUMENTS

| | | | |
|---|---|---|---|
| JP | 02-093503 | | 4/1990 |
| JP | 04075393 A | * | 3/1992 |
| JP | 05213626 A | * | 8/1993 |
| JP | 07110407 A | * | 4/1995 |
| WO | WO 92/33464 | | 4/2002 |

OTHER PUBLICATIONS

International Preliminary Report on Patentability mailed Mar. 14, 2013 in corresponding Application No. PCT/US2011/049934.

* cited by examiner

Expanded View of Metal Tube

REDUCING REFLECTION AT TERMINATION OF OPTICAL FIBER IN A SMALL VOLUME

PRIORITY APPLICATION

This application claims priority from U.S. provisional patent application Ser. No. 61/379,116, filed on Sep. 1, 2010, the contents of which are incorporated herein by reference.

TECHNICAL FIELD

The technology relates to optical fiber components, and more specifically, to the termination of optical fibers. The technology described below is particularly useful in interferometric measurements and optical fiber shape and/or position sensing applications.

INTRODUCTION

Optical strain sensing is a technology useful for measuring physical deformation of a waveguide caused by, for example, the change in tension, compression, or temperature of an optical fiber. A multi-core optical fiber is composed of several independent waveguides embedded within a single fiber. A continuous measure of strain along the length of a core can be derived by interpreting the optical response of the core using swept wavelength inteferometery. With knowledge of the relative positions of the cores along the length of the fiber, these independent strain signals may be combined to gain a measure of the strain profile applied to the multi-core optical fiber. In a technique known as optical position and/or shape sensing detailed in commonly-assigned U.S. patent application to Froggatt et al., entitled "Optical Position and/or Shape Sensing," application Ser. No. 12/874,901, filed on Sep. 2, 2010, which is incorporated herein by reference, this strain information can be used to reconstruct the three dimensional position of the fiber.

In many types of optical systems, including but not limited to optical strain sensing, low amplitude optical signals must be measured, either to receive communicated information or to sense small changes in the environment that change properties of the optical signal. In such systems, unintended optical power reflected at the end(s) of optical fiber(s) can create spurious signals that interfere with the detection of the intended signal. It is desirable to reduce the magnitude of these spurious reflections. The "return loss" of an optical fiber termination is the ratio of reflected light to the light incident on the termination. For optical fiber terminations, the return loss ratio of reflected to incident power is a negative sign.

$$RL'(\text{dB}) = 10\log_{10}\frac{P_r}{P_i}$$

A higher magnitude negative value return loss indicates a lower, more attenuated reflection.

For a standard silica single mode optical fiber, the effective index of core light is typically about 1.46. The power reflection coefficient for light incident on an index of refraction step from region of effective index $n_1$ to region of effective index $n_2$ is:

$$R = \left(\frac{n_2 - n_1}{n_2 + n_1}\right)^2$$

If a fiber core with an effective index of 1.46 is cleaved or polished to create a flat end in air of index 1, the reflection coefficient is about 3.5%, yielding a return loss of −14.5 dB. Thus, even a very small index step, or multiple small index steps give rise to substantial reflections.

In a particular class of fiber optic systems, return loss must be minimized and the volume of the termination is limited. See the example shown FIG. 1 where an optical fiber core 101 is of optical refractive index higher than a cladding region 102, which is surrounded by a coating 103. An allowed termination volume 104 is shown at the end of the fiber. When such an optical fiber is used as a sensor, it may be embedded inside a small structure and with the objective to sense as close as possible to the end of the fiber, which might be located very close to a surface 105 of a nearby structure. This close surface 105 may not be known, have a constant shape, or have a constant reflectivity. Uncontrolled light emerging from the termination will likely be close to the surface of the structure and might consequently be reflected back into the fiber core. If the surface might be ill-defined in shape or of varying reflective properties, then the light emerging from the fiber must be carefully managed so that it is not reflected but instead converted to another form of energy, usually heat, in the allowed termination volume 104. In this way, the converted light energy is not reflected back into the fiber disrupting light intended to be carried in the fiber.

As an illustrative non-limiting example, many single-mode optical fiber sensors are made with an outside fiber glass diameter of 125 um and a protective polymer coating resulting in a total fiber diameter between 140 and 250 um. The small size and flexibility of such fibers is an advantage in applications where they are embedded inside small flexible structures and can be used to sense changes to within 5 mm of the end of the fiber. Sometimes practical constraints dictate that the termination not extend radially beyond the size of the fiber coating. Otherwise, the structure that accommodates the termination, typically a channel or tube, would need to be larger than the structure that accommodates the coated fiber. It is preferable for a single structure to contain both the fiber and the termination. In an example case, the volume of the termination must fit inside a tube less than 325 um in diameter and be less than 5 mm long. That leaves a volume of no more than 0.415 mm³ for a termination to adequately eliminate, attenuate, and/or contain the light so as to avoid reflection back into the fiber from external surfaces.

For a highly sensitive optical sensing application in which one or more optical frequency domain reflectometry (OFDR) products offered by Luna Innovations are used to detect and resolve scattering in an optical fiber to within 50 um, a desired return loss of an optical fiber termination might be on the order of the amount of light that would be back-reflected by the inherent scatter from 50 um of fiber. This means that less than 3 parts per billion of the original light may be permitted to be reflected back into the fiber core which translates into a return loss on the order of −85 dB—a return loss requirement among the lowest of any known application. More generally, for many fiber sensing applications with small volume termination requirements, a minimum return loss value of −70 dB can produce useful data depending on the application requirements. A return loss of −70 dB may be acceptable when the signal being measured is greater than the average scattering from a fiber, for example when distributed Bragg gratings are added to the fiber. A return loss more like −75 or −80 dB may be acceptable if the fiber used is of a type that produces greater scattering than standard optical fiber, for example, if the index of refraction is high. Improving return loss in any case improves system signal to noise ratio.

In distributed shape-sensing systems offered by Luna Innovations, sensing is performed continuously from multiple cores embedded in the same fiber. Termination of such fibers poses further challenges because, unlike single core fibers, some of the cores are not centered in the fiber structure and are closer to the edge of the fiber. A core not centered in the structure poses a different challenge for termination than a core that is centered. Additionally, it is desirable to reduce the amount of light being reflected from one core back into any other cores, i.e., low cross coupling or "cross-talk" between cores at the termination may be required. Objectives for reducing cross-talk are similar to those for low return loss. Assuming the magnitude of light traveling in all cores is nearly equal, maintaining cross-talk below −70 dB, or below −85 dB for the more stringent applications is desirable.

A fiber with multiple cores that requires a small volume termination is shown in FIG. 2, which employs the same numerical labels as in FIG. 1.

Several methods for terminating an optical fiber are known. For example, the end of the fiber to be terminated might be attached to a fiber without a guiding core and with index of refraction matched to the effective core mode index of the fiber, a so-called "coreless" fiber. U.S. Pat. No. 5,263,103 describes that the index of refraction of the coreless fiber must nearly match the effective index of the fiber to be terminated. Also, the length of the coreless fiber would need to exceed 3 cm in order to achieve −70 dB return loss. Even so, this approach does not ensure that the light does not escape the termination structure to be reflected by a nearby external surface.

Alternatively, it is known that the reflection at the end of an optical fiber can be reduced by cleaving or polishing the end at a significant angle relative to the axis of an optical fiber. However, the quality of the angled surface is critical to the return loss achieved. Moreover, some of the light incident on the angled surface is still transmitted through the angled surface and some is reflected at an angle. If a reflective surface is brought in near proximity to the angled end, substantial reflection back into the fiber core may occur. If the light is allowed to expand into a large volume, it can eventually be absorbed to provide a low return loss. But as mentioned above, large termination volumes are not practical or desirable in many applications.

An anti-reflection coating could be applied to the surface of the fiber either as a stack of different optical index layers or an absorbing material such as carbon-black. But the diffuse reflection from carbon-black or from layered coatings is significant. In fact, any known material that is close to the termination which has primarily diffuse reflection does not achieve the low return loss needed for these demanding applications. If a material is to be placed close to the fiber, then it either needs to be a highly-absorbing, low-scatter, volume-absorber, or it needs to have a highly specular reflection and be arranged in a geometry such that multiple specular reflections, with high absorption, occur before the light finds its way back to the fiber, either into the core from which it was emitted, or into another core of the fiber. U.S. Pat. No. 6,496,643 describes using an absorptive material in a termination but requires it to be contained in the core of a fiber with a mode effective index matched to the effective index of the fiber to be terminated. Another issue with an absorber confined to the core of a termination is that it is not readily applicable to multiple cores. Furthermore, this approach leaves light in a small core at the end of the termination structure, thus not benefiting from the expansion of the beam into larger area.

Any material attached to absorb light at a fiber termination must be index-matched, either as a bulk material in a coreless fiber or by matching a mode in a guiding structure. FIG. 3 plots a theoretical reflection at a boundary as a function of index difference for a standard silica fiber directly coupled to such material. Direct attachment of any material to such a fiber would result in too high a return loss to meet the desired requirements described above unless the material index of refraction difference was less than about 0.001. The chance of finding a material in such a narrow index range which absorbs strongly enough to absorb a large portion of light within a few mm distance is very small. Many materials are highly absorbing but highly scattering or are not available in a form that is index matched to optical fiber. For example, metal particles embedded in almost any material are both highly scattering and highly absorbing for optical wavelengths. Such materials exist but produce a very high reflection when placed at the end of a fiber.

SUMMARY OF CLAIMS

The inventors overcame the challenges described above and met the need for a low volume, small dimension optical fiber termination.

An optical fiber termination provided at an end of an optical fiber including one or more cores includes a structure having a volume including an absorptive region of absorptive material provided to the end of the optical fiber that absorbs light emitted from each of the one or more cores to reduce reflections into the one or more cores to a return loss of −70 dB or less regardless of the presence of surfaces proximate the optical fiber termination. A length of the structure is less than 5 mm, and a largest transverse dimension of the structure is less than 325 um.

In a non-limiting, example embodiment, the structure has cylindrical symmetry, the volume is greater than 0.001 mm$^3$ and less than 0.415 mm$^3$, a length of 3 mm or less, and a radius of 100 μm or less.

The optical fiber termination structure includes a diffusion region formed from heating the end of the optical fiber together with a proximal portion of the absorptive region abutting the end of the optical fiber. The optical fiber is associated with a first index of refraction, and the absorptive region is associated with a second index of refraction. The diffusion region gradually transitions between the first index of refraction and the second index of refraction. If there is a mismatch between the first index of refraction and the second index of refraction, the diffusion region gradually transitions between the first index of refraction and the second index of refraction to reduce reflections that occur from the mismatch.

In a first non-limiting, example embodiment, the absorptive material absorbs light emitted from the one or more cores so that any light escaping the absorptive region and reflected by an exterior surface into the one or more cores results in a return loss less than −70 dB. For example, the absorptive material is borosilicate glass, cobalt-doped blue borosilicate glass, or chromium-doped glass.

In a second non-limiting, example embodiment, the absorptive region includes a light-absorptive tube. In one example implementation, the light-absorptive tube may be metal, and material of the absorptive region includes a coreless optical fiber at least partially encompassed by the light-absorptive tube. The coreless optical fiber diffuses at a proximal end with the end of the optical fiber, and the coreless optical fiber tapers at a distal end away from the end of the optical fiber. It may be desirable to fill the light-absorptive tube epoxy along with the coreless optical fiber for mechanical reasons and/or for the epoxy to absorb light.

The optical fiber may include multiple cores, and in that case, the structure reduces cross-coupling between terminations of the multiple cores to less than −70 dB. Moreover, one or more cores may be off-center in the fiber structure.

The technology also includes a method for terminating an optical fiber including one or more cores, comprising the steps of:

providing to the end of the optical fiber an optical fiber termination including light-absorptive material, and heating a portion of the light-absorptive material to form a diffused region so that the optical fiber termination absorbs light emitted from each of the one or more cores to reduce reflections into the one or more cores to a return loss of −70 dB or less regardless of the presence of surfaces proximate the optical fiber termination, wherein a length of the optical fiber termination is less than 5 mm and a largest transverse dimension of the optical fiber termination is less than 325 um.

DETAILED DESCRIPTION

Figure 1:
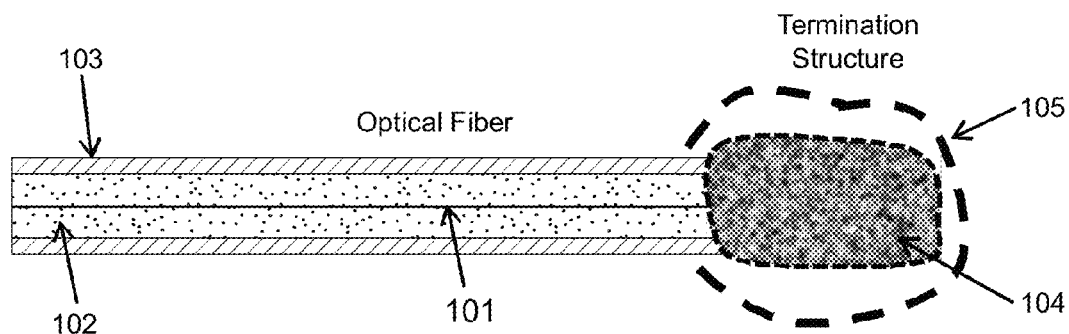
FIG. 1 illustrates an example of the challenge of a single core fiber termination in a small volume.
Figure 2:
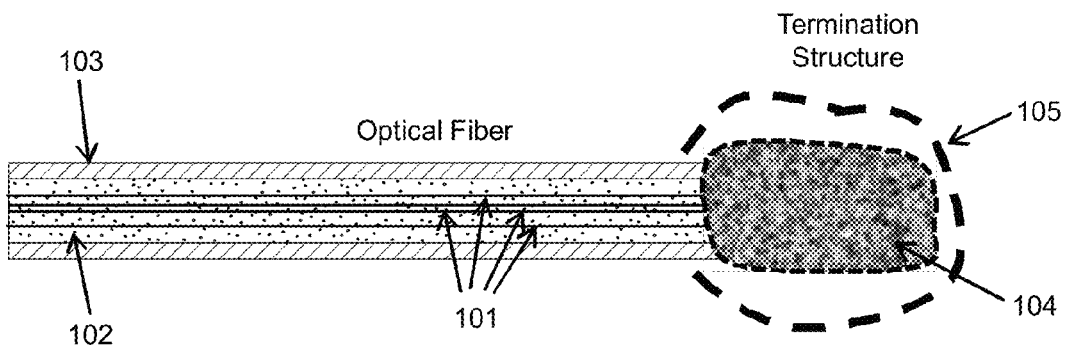
FIG. 2 illustrates an example of the challenge of a multiple core fiber termination in a small volume.
Figure 3:
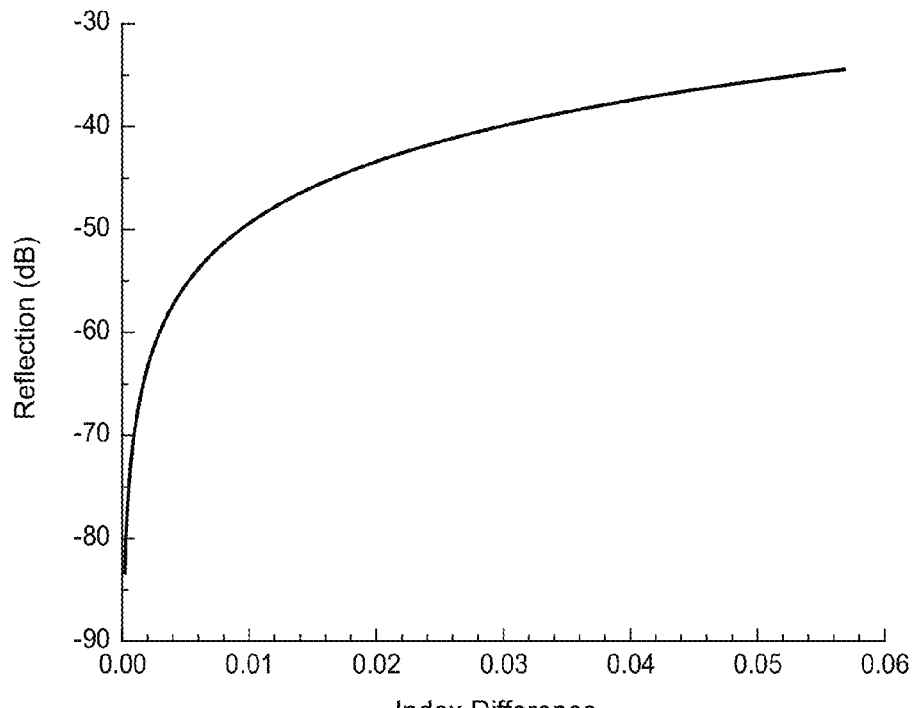
FIG. 3 shows a theoretical reflection expected as a function of index difference at the end of a piece of silica fiber with effective index 1.448.

The following description sets forth specific details, such as particular embodiments for purposes of explanation and not limitation. But it will be appreciated by one skilled in the art that other embodiments may be employed apart from these specific details. In some instances, detailed descriptions of well known methods and devices are omitted so as not to obscure the description with unnecessary detail.

The problems of decreasing return loss in both single-core and multi-core fiber terminations and reducing cross-coupling in multi-core terminations in a small volume that can be located in close proximity to unknown surfaces are solved by the technology described below. These problems extend beyond glass optical fibers with polymer coatings. Other forms of optical fibers may benefit from the technology described in this application.

The optical fiber termination described achieves an exceptionally low return loss termination in a small volume. A first characteristic for achieving this objective is the use of a material within an allowed, small termination volume of the optical fiber termination that is highly absorbing at the optical wavelength of interest, so that light is converted to some other form of energy, usually heat, within the termination volume. A second characteristic is that the index of refraction at the interface between the termination and the fiber end is configured to provide a gradual conversion of light to a large region without reflection in proximity to the core, where scattered light could couple back into the fiber. A third characteristic is that the absorbing material interacts with the light without substantial reflection back in the direction of the fiber while adequately reducing light emitted outside the termination volume. Different embodiments may employ all or less than all of these characteristics.

In order to achieve index or mode matching to silica-based optical fiber, silica-based glass doped with certain materials such as cobalt or chromium can have desirable absorption and scattering properties, but do not match the index of refraction of the fiber to be terminated, and often produce high levels of scattering when the dopant level is high enough to absorb many dBs of light within a few millimeters. A 10 dB/cm absorption is possible in such glasses in silica cores, but this is not high enough for many small volume termination applications. Other glass compositions that support higher levels of absorbing dopant unfortunately have substantially different indexes of refraction.

The inventors discovered that the mismatch between two materials, particularly two glass materials, can be sufficiently reduced by thermally heating the interface to a high enough temperature so that the components of the fiber to be terminated and the absorbing termination material diffuse into each other. This creates a radial diffusion of the core of the fiber to be terminated, e.g., a cone-like taper of the core, while also creating a gradient index region transitioning from the fiber index of refraction to the index of refraction of the terminating material.

Figure 4:
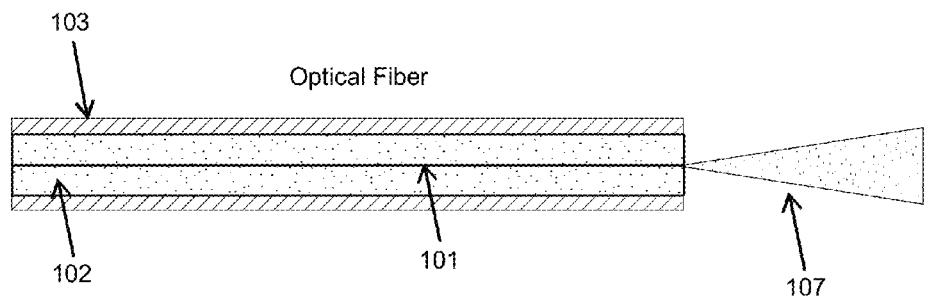
FIG. 4 depicts light expanding from the end of a single mode single core fiber into a non-guiding region.

Metals in crystalline form, as opposed to doped into a glass or other material composition, are effective absorbers of optical wavelengths of light, and light does not pass through even extremely thin metal layers. However, metals are also effective reflectors. So a solid metal surface or metal particles embedded within another material, such as an epoxy, placed at the end of a fiber absorb substantial incident light but also produces very high levels of reflected light. Depending on the angle of incidence, the light can return back to the fiber core or can be multiply reflected to eventually partially return to the fiber core. If the fiber has multiple cores, the challenge of preventing light from returning to any of the cores is increased. However, when light is incident on a smooth metal surface at a grazing angle, the metal produces a high specular reflection (like a mirror) and a low diffuse reflection (does not scatter in all directions) so there is rapid absorption of light that is not reflected. Once light leaves the guiding core of an optical fiber, energy will spread in the direction transverse to the direction of propagation. This well known phenomenon is typically referred to as beam divergence. FIG. 4 depicts light expanding from the end of a single mode single core fiber at 107. If a surface of metal is parallel to the direction of propagation of the light, the light can interact with the metal surface gradually as the optical beam diverges. It is not possible to achieve only grazing angle interactions if the metal is randomly distributed in an epoxy placed in the direct path of the light. So only a carefully designed physical structure that controls the interaction of the metal with the light can achieve the desired result. In one example embodiment, a metal tube is placed over the end of the fiber to mechanically protect the end of the fiber. The surface of the metal tube or other metal termination structure shape does not need to be parallel to the direction of propagation of the light. Rather, the orientation of the optical fiber in the termination may be manipulated to cause the light to interact with the metal surface over a shorter length such that the back reflection remains small while substantially all the light is absorbed by the metal within a short distance in the light propagation direction. The rate at which such a metal surface can absorb light from an expanding optical beam while keeping the reflected light to a low level dictates how a small termination volume can be achieved.

Figure 5:
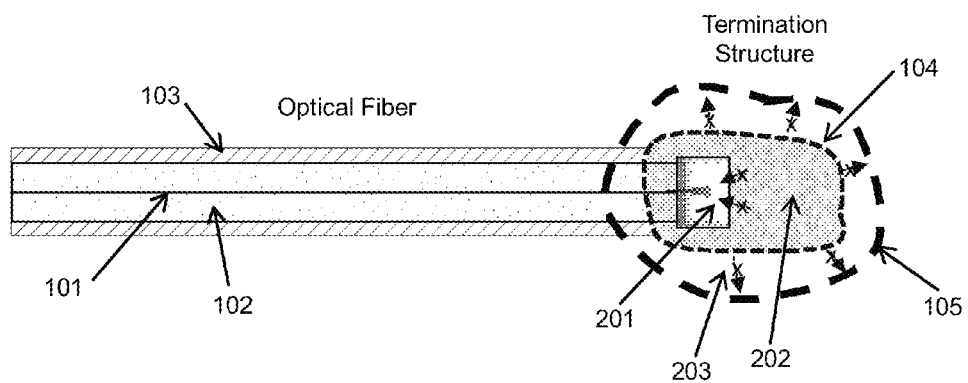
FIG. 5 is a non-limiting example illustration of features implemented in a small volume termination for single core fiber.
Figure 6:
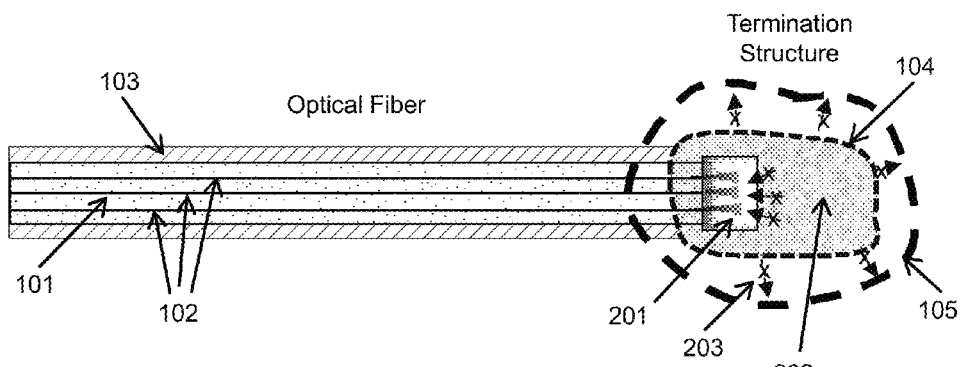
FIG. 6 is a non-limiting example illustration of features implemented in a small volume termination for a multi-core fiber.

The features implemented for creating a small volume optical fiber termination capable of being placed in immediate proximity to another reflecting surface is shown in FIG. 5 for a single-core fiber and in FIG. 6 for a multi-core fiber. The optical fiber termination volume need not be any particular shape, e.g., cylindrical, or have a particular symmetry. Light emerging from the optical fiber passes through a diffusion/transition region 201 in which the fiber core(s) expands laterally, and the index of refraction gradually transitions from the/each core's index to the index of material in the absorption region 202 of the optical fiber termination. The absorbing material is depicted as occupying the entire allowed termination volume 104. However, the distribution of absorption is not critical as long as the magnitude is adequate, and the remaining light is controlled so that a substantial quantity does not cross the boundary from the allowed termination volume 104 to hit the next surface 105 or to reflect substantially back towards the core, as indicated by the crossed out arrows 203.

The example structures in FIGS. 5 and 6 include a diffusion/transition region 201 that allows light to expand from the core(s) of the fiber into the termination volume 104 that includes an absorbing region 202 to absorb the wavelength of interest and convert the light to heat or another form. The absorbing region 202 preferably contains an absorbing material. The absorbing material need not be uniformly distributed within the absorption region 202 as long as the amount of light that escapes or is reflected back to the cores is controlled. These structures prevent or at least largely prevent scattered light from propagating back into the cores or out of the termination volume 104.

The diffusion/transition region 201 may achieve different degrees of matching between dissimilar materials depending upon the amount and type of processing performed, the initial mismatch, and the requirements of the application (processing may stop when an adequate match is achieved). A greater scattering back into the core from the absorption region may be allowed in order to utilize a doped material that absorbs more light rapidly, thus making the device smaller at the expense of performance. Greater escaped light may also be allowed to make the device smaller if the characteristics of the next surface to be encountered are known or can be controlled. The crossed-out arrows in the figures do not mean that absolutely no light passes that direction, only that the light is managed to the level required by the application.

Figure 7:
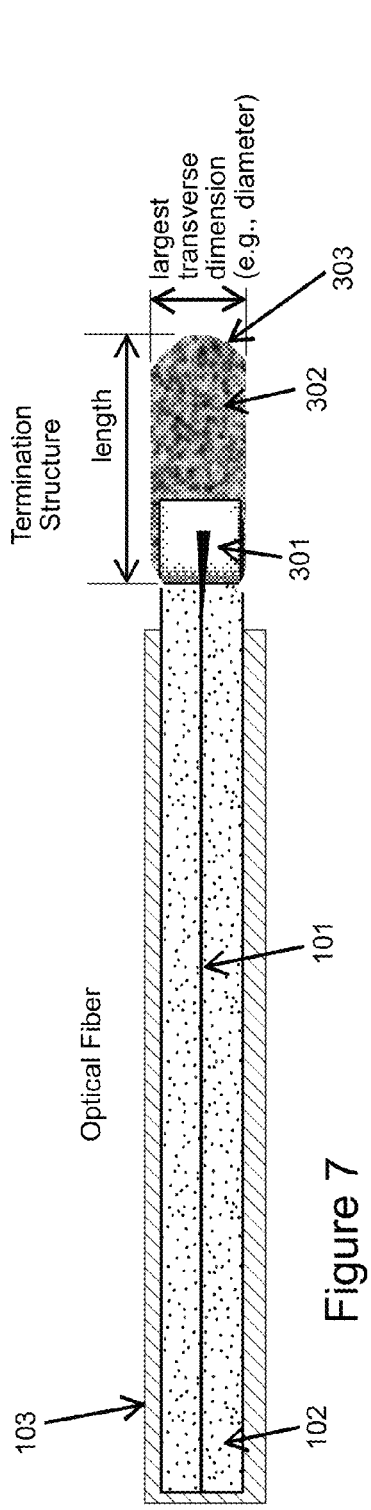
FIG. 7 is a non-limiting example first embodiment of a termination with a diffused region to produce a matching to highly absorbing material.

A first example, non-limiting embodiment is depicted in FIG. 7 that employs all of the three characteristics mentioned above. In this embodiment, the termination structure 302 includes an absorbing material occupying at least a majority of the full termination volume and is directly attached to the end of the fiber to be terminated by heat processing at the end of the fiber interface. The absorbing material is chosen to be adequately absorbing to convert the majority of light to heat in a small volume but with minimal scattering. Additionally, careful thermal treatment in the diffusion region 301 ensures that reflections that would otherwise result from index mismatch are prevented or at least substantially prevented. Both ends of the termination structure 302 are depicted as being somewhat rounded because this is generally the natural result of using thermal processes. Processes that cause diffusion at the fiber/termination boundary typically produce a smoothing rounding effect between the materials. Many processes can be used to produce the far boundary of the structure. For the example in FIG. 6, the termination is heated and pulled off, creating the rounded effect shown. However, the termination may also be cut, polished, cleaved, crushed, snapped, or broken in other ways that may produce acceptable results.

Figure 8:
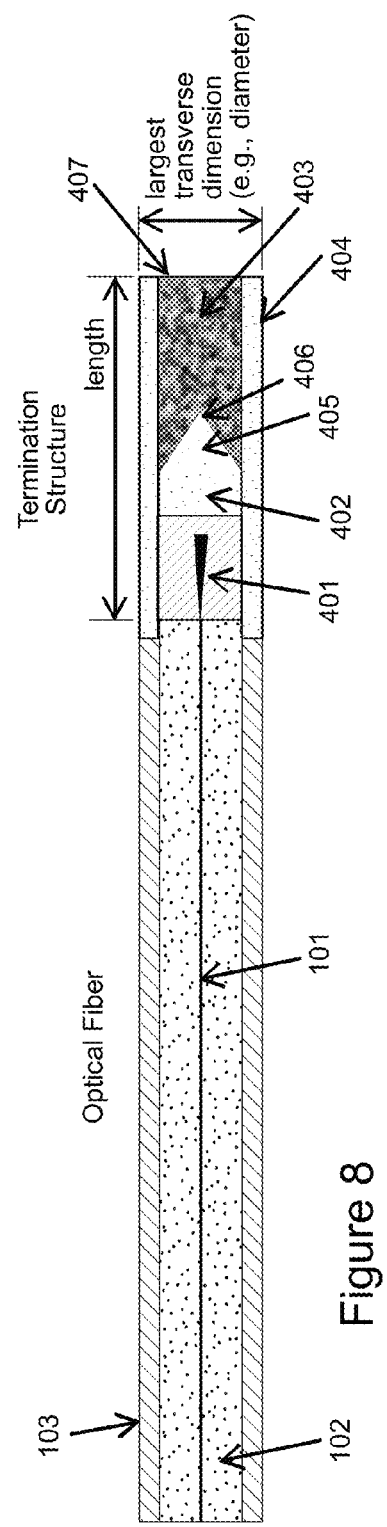
FIG. 8 is a non-limiting example second embodiment of a termination with a metal tube to act as an absorber around a coreless taper.

The length and diameter of the termination structure 302 are labeled under the assumption of cylindrical symmetry where the termination volume is given by $V=\pi D^2 l/4$. FIGS. 7 and 8 show a largest transverse dimension corresponding to the diameter of those cylindrical structures. But other shape structures are possible that lead to a different termination volume and shape. Nevertheless, every structure includes some sort of length and largest transverse dimension. Although the term diameter is used in the examples below, the technology is applicable to any termination shape regardless of whether it has a diameter dimension.

Figure 8A:
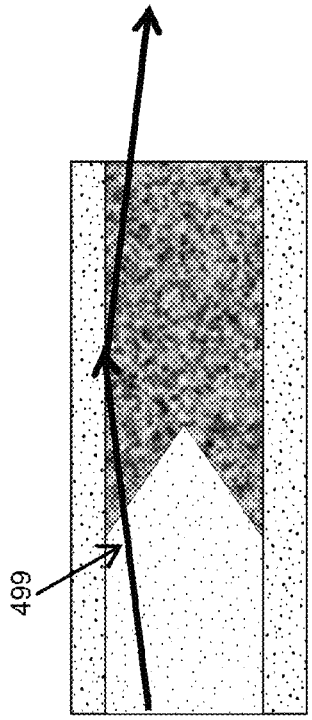

A second non-limiting example embodiment of a termination structure that achieves the three characteristics described above is shown in FIG. 8. A material with index of refraction similar to the index of the core to be terminated 402 is used inside the termination volume and is tapered 405 some distance from the expanded fiber core in the diffusion/transition region 401. To terminate a silica-based optical fiber, the termination may use an undoped silica fiber to allow the light to expand and an index-matched epoxy or other material once expanded at the end of the undoped silica fiber 406. Light absorption is produced by interaction at a grazing angle 499 shown in an expanded view at FIG. 8A with a light-absorbing tube 404 suitably prepared on the inside surface of the tube to prevent significant diffuse reflection toward the fiber core 101. Preparation of the inside of the tube can include a wide variety of commonly practiced manufacturing techniques including but not limited to cleaning, deburring, and polishing and such preparation might not be a separate processing step. In some cases an as-made tube will have acceptable performance without additional processes.

If properly implemented, the diffuse reflection from the inside of the tube is a small fraction of the incident light. The tube 404 may be made of metal and may also be filled with an index-matched epoxy 403 that allows for propagation to the end of the metal tube. Some light-absorption may also be produced by selecting a matching material, possibly an epoxy, with some level of light-absorption. Other various implementations of this example embodiment that allow light to expand into a coreless material and then interact with metal or other specular reflecting material at a grazing angle are also possible. As defined here, a grazing angle has an angle of incidence between the light and the surface normally greater than 45 degrees, and more preferably greater than 75 degrees. The grazing angle needed to achieve acceptable reflections depends on the amount and direction of diffuse reflections from the tube surface.

The taper 405 may be made with coreless fiber in order to efficiently launch light from the core(s) into the termination volume without producing any scattering events close to the end of the core(s). It is beneficial if the termination media 403 is nonscattering, has an index of refraction close to but slightly above the index of refraction of the taper 405 material, and adheres the coreless material 402 to the light-absorbing tube 404. The termination material index of refraction should be close enough to the taper 405 index of refraction so that the reflection from the interface between the taper and the termination media, when coupled back into any core, is below the desired target return loss and allowed cross coupling magnitude. For example, commercially available optically transparent epoxies are suitable for the termination media. Although the termination media may be light-absorptive, this is not necessary if the termination region is bounded at least in part by a light-absorbing tube 404. The light-absorbing tube 404 geometry reduces scattering back into the core(s), because most scattered photons will propagate forward, while also providing a high degree of light-absorption. Commercially available hypodermic needle stainless steel tubing is an example of a readily available and suitable material for a light-absorbing tube 404. The light-absorbing tube 404 combined with the taper 405 and termination media 403 form a highly light attenuating, multi-mode waveguide.

Figure 9:
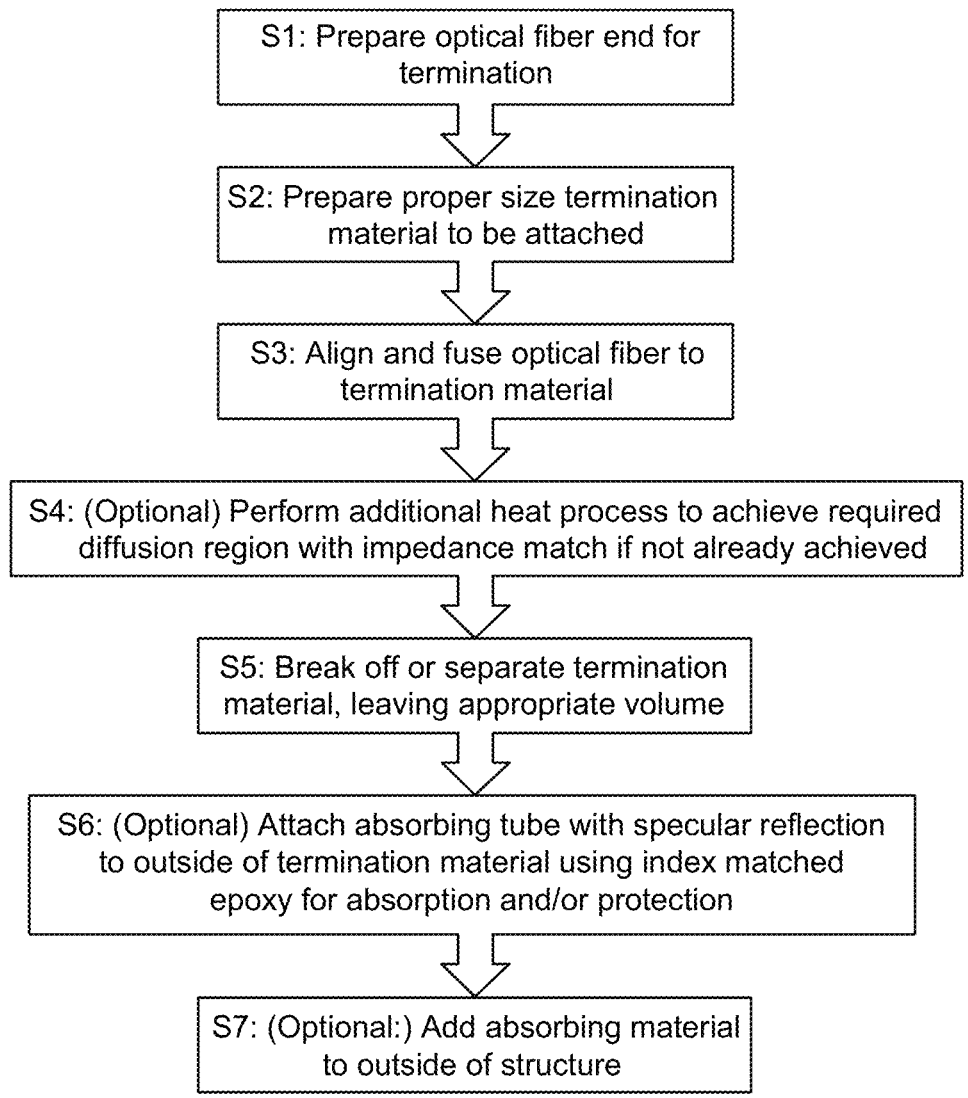
FIG. 9 is a process flow diagram showing non-limiting example steps for making a small volume fiber termination.

The non-limiting example fiber termination structure embodiments shown in FIGS. 7 and 8 and variations thereof might be made by a non-limiting, example process described by the flow diagram of FIG. 9. Although the illustrated order of operations is a preferred order, other orders may be used, e.g., as new materials and processing methods become available. In some cases, it may be possible to combine several of the steps into a single processing step. For example, diffusion and material separation might occur in a single heat process.

The following is a specific procedure for terminating an optical fiber in a small space with very low back reflection at the termination to produce the non-limiting example embodiment shown in FIG. 7. A person skilled in optical splicing and thermal processing techniques understands that some variations of the procedure will also produce acceptable results and that not all steps necessarily need to be performed. The procedure was carried out on a Fujikura FSM-40PM Arc Fusion Splicer with firmware version 2.0.7 controlled by Splicelab software version 2.0.7. The steps used in this procedure corresponding to the step labels in FIG. 9 are now described.

Step S1: Prepare the fiber optic end for termination by removing some coating, cleaning off residue, and cleaving the end. Cleaving the end at a 15 degree angle, for example, can improve the final result, but a flat (0 degree) cleave produces acceptable results for many applications.

Step S2: Prepare proper size termination, e.g., by pulling light-absorptive glass down to a diameter on the order of the diameter of the fiber optic to be terminated.

Step S3: Place the prepared optical fiber end and a proximal end of the light-absorptive material, e.g., glass, into a fusion splicer, bring them into proximity. Position the interface between the optical fiber end and the termination's light-absorptive material such that the fiber end is exposed to a higher temperature than the absorptive material, and fuse together by heating, e.g., with a high power arc.

Step S4: Optical measurements at this point may well show that the two materials are physically connected but the reflection from the interface might be too large. Perform additional heating to achieve desired/required diffusion region with impedance match and to achieve an acceptable reflection loss (if not already achieved), e.g., with a high power arc. It may be necessary to move the fiber and the absorptive material together to prevent the interface from separating Step S5: Break off, separate, form, mold, etc. termination material to produce the desired length and/or volume for termination structure. One way to separate the termination absorptive material from the rest of the material so that an appropriate length of the absorptive material is attached to the optical fiber is to reposition the fiber in the splicer, fire an arc, and pull the two ends of the structure apart such that the glass stretches and then breaks at the point where it is heated. It may be necessary to repeat the pull-off step several times to separate the glass. It may also be necessary to reposition the structure between arcs to achieve an optimal taper. It can be beneficial to separate the termination material in such a way that the end has a prescribed geometry, e.g., a taper.

Step S6: Place a tube over the termination material attached in steps 1-4. Attach the tube to the termination material with adhesive, e.g., index matching epoxy. The tube can be added to provide benefit in absorbing light or for mechanical protection. The step of adding of a tube for the second example embodiment in FIG. 8 is not required for the first example embodiment as depicted in FIG. 7.

Step S7: Add a light-absorbing material to the surface of the termination structure. In the case of embodiment 1, the material might be added to the entire surface of the structure or just added to particular regions, e.g. the end only. This can be particularly useful when the termination structure is expected to be used in close proximity to a reflective surface, but it is not required if an adequate result is achieved without such material.

It is a common understanding in the fiber optic field that fusion splicing dissimilar fibers is difficult, requiring very precise splicing techniques. This understanding is based on attempts to splice dissimilar fibers with dissimilar small size optical modes, a process that requires very low distortion of the shape of the fibers at the interface, and careful diffusion matching to match the optical mode through the structure, while also trying to achieve robust mechanical attachment. In contrast, terminating a fiber using the approach described above is a different situation because it does not require a mode match, requires substantially more heat processing to diffuse the core to a greater extent, and may even benefit from some amount of distortion at the diffusion layer. The inventors discovered that, under these circumstances and contrary to what people skilled in the art assume, very dissimilar materials can be fused, diffused into each other, and mechanically attached.

The process above was performed to terminate a test silica fiber with 7 single-mode germanium cores arranged with 6 cores around 1 centered core with a core-to-core spacing of 35 um. Only 4 of the cores, 3 symmetrically arranged around the center core, were used in the example test. The test fiber had an outside glass diameter of 125 um and was terminated using different absorbing materials. The first absorbing material was Blue Vycor® 7904, with a composition of 96% $SiO_2$, 3% $B_2O_3$ and 1% being a mixture of $Na_2O$, $Al_2O_3$, $ZrO_2$, and CoO. The concentration of CoO is estimated to be less than 0.1%. The index of refraction of Blue Vycor is well-matched to the effective index of refraction of the optical fiber's guided mode. This absorbing material was successfully fused to the fiber and produced acceptable interface reflection results but required a length in excess of 1 cm to achieve acceptable return loss for the termination. Blue Vycor was measured to have an absorption of 1.4 dB per mm for light with a wavelength of 1550 nm. It was found that a cobalt-doped blue borosilicate glass with composition approximately [0-45%, Na-3%, Al-2%, Si-35%, B-13%, Co-2%] had a significantly higher absorbance, on the order of 13 dB per mm. The index of refraction of the borosilicate glass is significantly different than the effective index experienced by the guided light in the fiber core. It was found that the reflection at the material interface could be reduced by heating the interface for a sufficient length of time to a sufficient temperature. If the heating is done with a plasma arc, the temperature is typically not known. In this case, the interface is heated until interface reflections are acceptable, as observed using an appropriate optical measurement tool. The heating process can be done as one continuous step or as a series of shorter steps with intervening measurements to produce better process control.

Ten terminations were made using the above described process with the borosilicate glass, the fibers being angle-cleaved before fusing, and all terminations being heat processed multiple times to achieve an acceptable reflection at the fiber to absorptive glass interface. All terminations, once separated, measured less than 3 mm in length beyond the initial fiber end with an outer diameter less than 190 microns with a total termination volume approximately 0.085 mm$^3$. No metal tube was added to these terminations (Step 6 was not performed). The reflection of 4 of the cores was measured for all ten terminations. All terminations had reflections measured at less than −70 dB return loss. Terminations can be produced which have reflections less than −85 dB by skilled operators and carefully following the procedures described.

To confirm the importance of the diffusion boundary region, one of the terminations with borosilicate glass was made as described above and the resultant return loss for the central core was measured as the heat fusing step was repeated several times. The return loss after each heat process is summarized:

| Number of Fusion Heat Processes | Resultant Return Loss (dB) |
| --- | --- |
| 1 | −76 |
| 2 | −83 |
| 3 | −87 |
| 4 | −89 |
| 5 | −92 |

Each successive heat process produces a smoother, more gradual diffusion boundary region and therefore a lower reflection coefficient.

The following calculation is helpful in estimating the required absorption of the material used in the termination for this approach. Assuming that light from the fiber core expands smoothly through the diffusion region with little reflection, and expands to fill the structure, it is important that the light be absorbed rapidly enough to avoid other reflections, particularly reflections from the boundary of the termination to an air interface or from any reflection beyond the structure. The main such reflection is typically from the far end of the structure and such light passes twice through the absorbing material. Assuming that this is the dominate reflection into the core, the return loss may be estimated as:

$$RL \text{ (dB)} = 10\log_{10}\left(\frac{A_{core}}{A_{clad}}\right) + R_{end} \text{ (dB)} - 2\alpha l$$

where $A_{core}$ is the area of the core mode of the fiber, $A_{clad}$ is the area of the fiber cladding, $R_{end}$ (dB) is the reflection coefficient of the end of the structure, $\alpha$ is the absorption per unit length in dB/mm of the absorbing material and l is the length of the absorbing material in mm. This equation assumes the light expands into the area of the cladding, and so the light coupled to the core after reflecting from the far end is reduced approximately by the ratio of the areas of the core to the cladding, by the absorption produced by passing twice through the absorbing region, and by the magnitude of the direct reflection at the end. So there are three ways to reduce the measured reflection: 1) absorb the light on the round trip pass from the core to the most distal surface and back to the core, 2) reduce the amount of light reflected from the most distal surface, and 3) make sure the reflection from the most distal surface does not reflect directly back into the core. The assumption is that the light has successfully left the core without a large reflection at the core-to-material interface. If the end is a glass air reflection with −14 dB reflection and the area ratio is for a typical 125 um single mode fiber about a factor of 200 or −23 dB, then the loss of 2 passes through the termination material would need to be 33 dB to achieve a −70 dB reflection. If this is to be achieved in 2 passes through a 2 mm length in this example, then the termination material absorption is preferably at least 8.25 dB/mm.

The maximum length and largest transverse direction (e.g., outer diameter) of the termination structure are limited by the requirements to fit inside an external structure of small size and to sense within a certain length of the physical end. These limits are set at 5 mm length and 325 um by practical application. The greatest outer diameter of the termination is measured by measuring the largest transverse dimension of the termination structure. The termination structures described above for this first example embodiment are all substantially smaller than these upper limits. Increasing the size of the termination structure does not diminish the optical performance, and therefore, any larger termination may be used. On the other end of the range, the minimum length is set as described above by the absorption rate achieved by the absorbing material. In example tests, 2 mm termination lengths have been achieved. The minimum largest transverse dimension of the termination structure is limited by the requirement to couple light from all cores of interest into the termination structure and then achieve the desired return loss. For a multi-core fiber, all cores must be enclosed by the diffusion region of the termination, so this is one practical minimum. In the case of the example 7-core fiber with 35 um core spacing described here, the outer extent of the cores is 70 um. For a single core fiber, the termination must be larger than the core, which is typically only a few microns in size. Additionally, the minimum largest transverse dimension is limited by the inverse relationship between beam divergence and the magnitude of light reflected into an optical core, represented by the cladding to core area ratio described above. If the light does not diverge as much, than a higher absorption rate is required of the absorbing material and/or a lower reflection from the distal end must be achieved in order to attain the required overall return loss. The smallest volume terminations built by the inventors to date using the technology in this application is method have a 2 mm length, less than a 190 um maximum transverse dimension, and an overall volume approximately 0.0567 mm$^3$ The inventors believe the minimum achievable volume using the technology in this application may approach 0.001 mm$^3$ by using rapid absorption and smaller diameter material.

Figure 10:
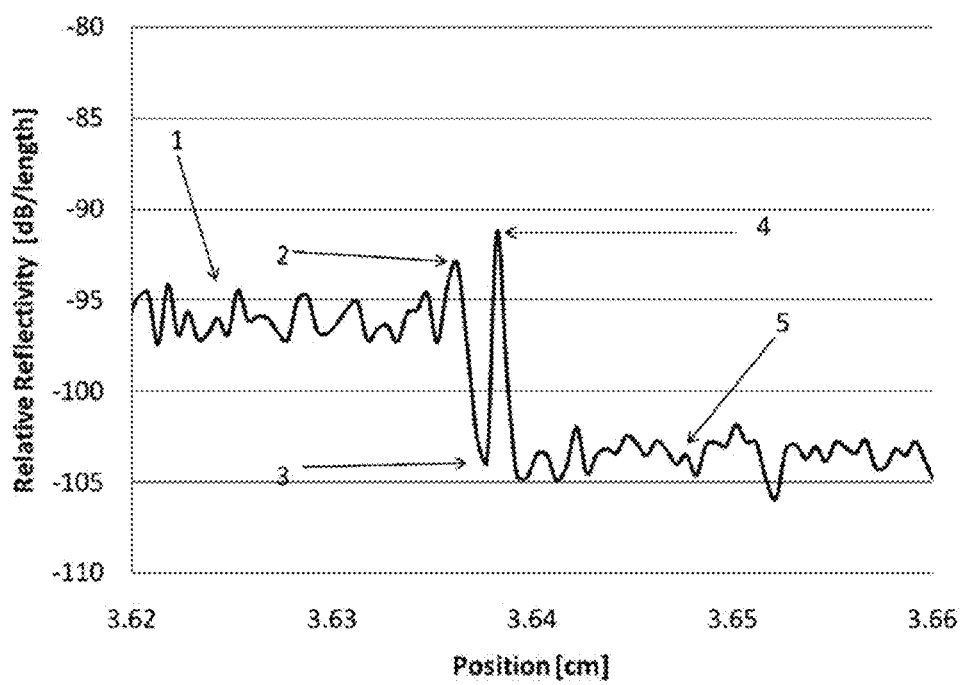
FIG. 10 is a plot of a distribution of the reflectivity at the end of a fiber with a 2 mm long termination.

FIG. 10 is a graph of the reflection as a function of position at the end of a test fiber with a 2 mm long termination. The data was measured using a Luna OBR, and the value on the Y axis represents the power reflected per spatial resolution of the system, which is 40 um in this example. An integral of this graph over the length of the termination structure, scaled for the number of points and resolution, is the return loss of the termination. In the graph, 5 indicates the noise floor of the measurement, 1 indicates the scattering that is inherent in the fiber, 2 indicates a small increase in reflection over the intrinsic scatter that occurs at the transition region, 3 indicates the very small value that is measured for reflection in the absorptive material which is indistinguishable from the noise floor of the measurement, and 4 indicates the reflection from the interface between the distal surface of the termination structure and air. The reflection loss at 4 is above the reflection loss indicated at 1, but these reflection loss values may be acceptable for most applications.

Figure 11:
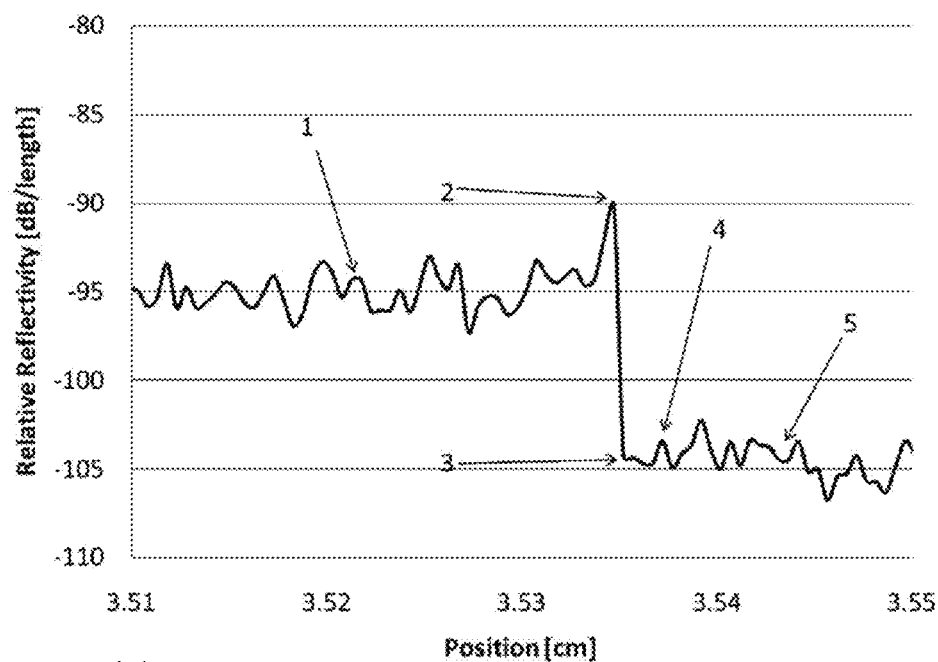
FIG. 11 is a of the distribution of the reflectivity at the end of a fiber with a 2.5 mm long termination.

FIG. 11 is a graph of the reflection at the end of a fiber with a 2.5 mm long termination. Similar label numerals are used as for FIG. 10. The measurement in FIG. 11 indicates that the absorption of the glass absorptive material in the termination attenuates the light enough that the end of the termination is no longer able to scatter substantial light into the core. Comparing the peak indicated by number 4 in both FIGS. 10 and 11 a termination measured in FIG. 11 produces a reflection from the most distal surface that is indistinguishable from the measurement noise at 5, while the termination measured in FIG. 10 produces a reflection from the most distal surface at 4 that is larger than the fiber scatter at 1. This shows that a termination longer than 2 mm is needed if it is required to have a reflection below fiber scatter and this particular material is used.

Figure 12:
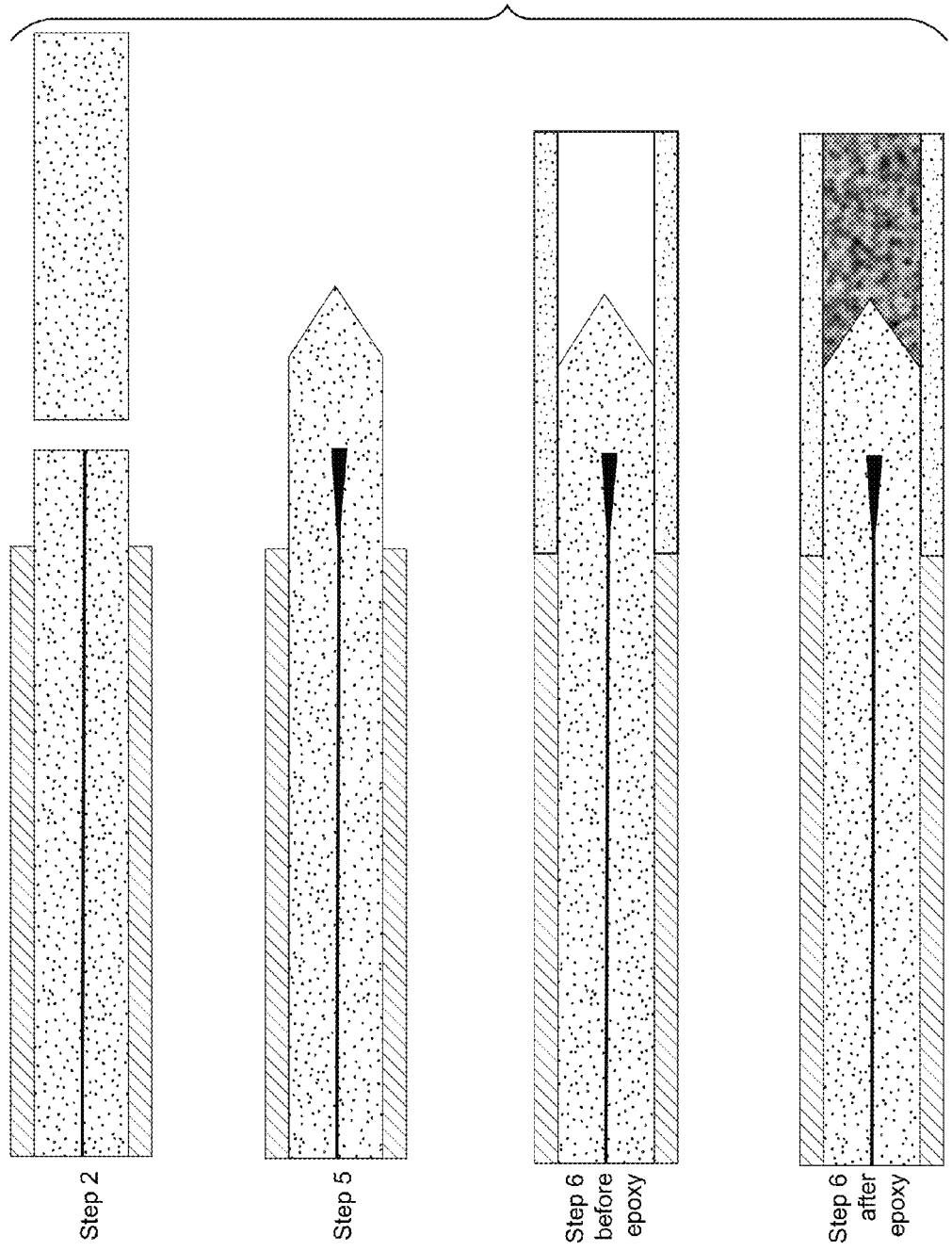
FIG. 12 shows examples of a physical configuration of a metal tube termination process after steps 4, 6, 7, and 9 of process outlined in FIG. 9.

The second example embodiment may also be produced by a process as summarized by FIG. 9. The following example procedure may be used for terminating an optical fiber in a small space with very low back reflection at the termination in accordance with the termination structure depicted in FIG. 8. Those skilled in the art of optical splicing understand that variations of the procedure will also produce acceptable results. The procedure was carried out on a Fujikura FSM-40PM Arc Fusion Splicer with firmware version 2.0.7 controlled by Splicelab software version 2.0.7. The procedure is summarized as follows with an example result at steps 2, 5, and 6 being depicted in FIG. 12.

Step S1: Prepare the fiber optic end for termination by removing some coating and cleaving the end. Cleaving the end at an angle, for example, can improve the final result, but a flat (0 degree) cleave produces acceptable results for many applications.

Step S2: Prepare proper size termination material by stripping coating and cleaning coreless fiber material.

Step S3-S5: Place the prepared optical fiber end and a proximal end of the light-absorptive material, e.g., glass, into a fusion splicer, bring them into proximity. Position the interface between the optical fiber end and the termination's material such that the termination material is exposed to a higher temperature than the fiber end, and fuse together by heating, e.g., with a high power arc. At the end of the heating arc, move the materials apart, such that the termination material excess is separated from the fiber. These 3 steps may be separated to allow control of the quality of the diffusion and separation processes independent of the fusion process (as in embodiment 1). But these were not separated in the example test implementation described.

Step S6: Remove terminated fiber from the splicer and position a clean metal tube (for the second example embodiment) over the terminated end pushed against the end of the optical fiber coating. Wick epoxy that is closely index-matched to the coreless fiber into the metal tube and thermally cure for several hours. Clean off excess cured epoxy from end of tube and from the point of attachment with fiber-optic and coating. Add more epoxy inside the metal tube if desired for mechanical reasons.

Step S7: Another optional step is to add light-absorbing material to the outside of the termination structure. In the second example embodiment, the material is advantageously added only to the most distal end because light does not escape through the metal tube.

This process was performed for an example 125 um fiber with 7 single-mode cores, each with numerical aperture 0.21 located as 6 cores around 1 central core with 35 um core to core spacing and with an acrylate coating diameter approximately 200 um. The metal tube used was a 34 gauge, ultra thin wall (34UTW) stainless steel tube 3 mm long with 128 um inside diameter and outside diameter approximately 195 um, smaller than the coating material. In this case, the tip of the terminated fiber optic was generally located about 1 mm from the tube end, allowing about 1 mm of epoxy in the tube. The Epoxy used was Epo-Tek 301 A+B 2-part epoxy. The coreless fiber used was OFS part #552 HPWR040.

Figure 13:
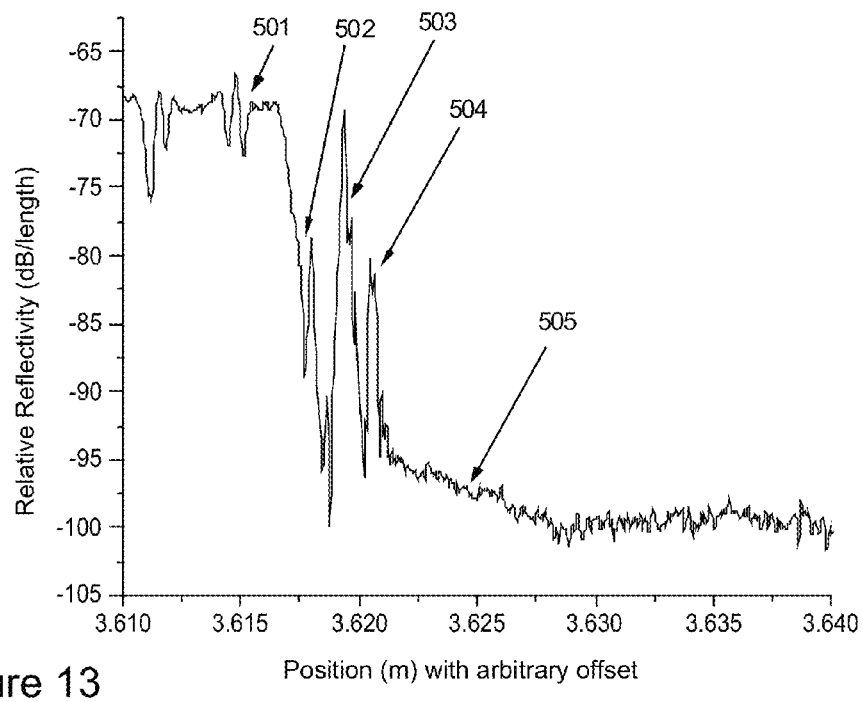
FIG. 13 graphs reflection vs. position for a metal tube termination of a 125 um fiber with a 3 cm tube for a center core.
Figure 14:
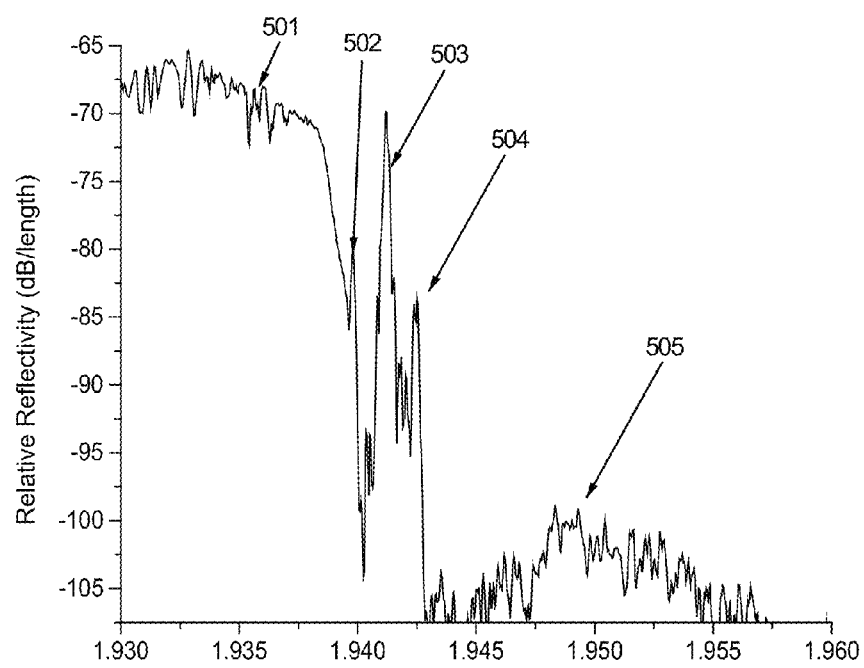
FIG. 14 graphs reflectivity vs. position detailed for a metal tube termination of a 125 um fiber with a 3 cm tube for a core 35 um from center.

Twenty-one (21) such terminations were made, and the return loss for 3 of the outer cores and the center core were measured, as summarized in Table 1. All measured cores typically achieved less than −70 dB return loss. Using a Luna Technologies OBR the reflection of termination T076 was measured for the center core and one outer core (35 um from center) and the results are plotted in FIGS. 13 and 14, respectively. There are fiber gratings in this fiber that set the sensing level at 501. Reflections are observed at the diffusion region 502, the glass-epoxy interface 503, and the epoxy to air interface 504. The noise floor is 505. The relative magnitude of the 3 reflections varies with the process and differs for outer and central cores. The total integrated reflection for all 3 reflections is the value reported in Table 1 for T076. The distance from the point at which the grating reflection drops to the farthest reflection was measured at 3 mm, the length of the metal tube.

TABLE 1

Return Loss terminations made by metal tube approach for 4 cores:

| Termination | RL of 3 outer cores (dB) | RL of center core (dB) |
| --- | --- | --- |
| T071 | −88.9, −83.3, −79.6 | −73.2 |
| T072 | −74.7, −80.3, −72.8 | −73.0 |
| T073 | −74.9, −77.5, −75.4 | −73.6 |
| T074 | −75.5, −85.3, −75.8 | −76.1 |
| T075 | −78.9, −79.7, −81.2 | −77.1 |
| T076 | −80.2, −78.5, −76.3 | −78.2 |
| T077 | −78.0, −78.7, −74.9 | −76.8 |
| T078 | −83.9, −81.1, −79.3 | −76.8 |
| T079 | −72.4, −75.5, −73.1 | −73.2 |
| T080 | −78.9, −79.6, −71.3 | −70.7 |
| T081 | −85.9, −82.7, −78.8 | −77.4 |
| T082 | −79.1, −82.8, −76.7 | −78.4 |
| T083 | −74.3, −77.3, −74.1 | −74.6 |
| T084 | −76.5, −76.1, −75.3 | −71.8 |
| T085 | −72.0, −71.0, −73.6 | −70.6 |
| T086 | −86.3, −82.0, −83.1 | −77.9 |
| T087 | −80.5, −79.5, −79.8 | −76.7 |
| T088 | −80.9, −81.5, −75.0 | −74.9 |
| T089 | −69.8, −71.7, −71.1 | −71.5 |
| T090 | −75.7, −77.7, −75.3 | −74.2 |
| T092 | −75.5, −76.0, −71.9 | −73.2 |

TABLE 2

Crosscoupling Values for Select Metal Tube Terminations

| Sensor | Input | Output | Return loss |
|---|---|---|---|
| T076 | center | A | −79.4 |
|  |  | B | −83.4 |
|  |  | C | −82.3 |
|  | A | center | −78.9 |
|  |  | B | −83.6 |
|  |  | C | −83.6 |
| T078 | center | A | −84.1 |
|  |  | B | −85.9 |
|  |  | C | −84.1 |
|  | A | center | −85.5 |
|  |  | B | −86.5 |
|  |  | C | −87.5 |

Because these are multi-core fiber terminations, the performance with respect to cross-coupling for such fibers was also assessed. Cross-coupling for select terminations was measured using an OBR, and the results are charted in Table 2. All combinations of cores produce values less than −75 dB, indicating that these terminations effectively control the light from one core entering another core. The data includes both centered cores and 3 outer cores labeled A, B, and C located at a 35 um radius showing that light is not reflected back to different cores any more than it returns to the core from which it was launched. The reflection to different cores is generally lower by several dB when compared with the direct back reflection The grazing angle metal tube used in the test did not achieve as much absorption as the borosilicate glass used in the test. For the test fiber, the light expands from the fiber core such that it must propagate about 0.6 mm before it reaches the metal tube boundary. While one might believe that the epoxy serves as the absorber in this structure, a search for index matched epoxy absorbing at the required rate but not scattering back into the core proved unsuccessful. The epoxy absorption in this non-limiting test case is minimal. So, unlike the approach with a volume absorber placed intimately in contact with the optical waveguide, a lower limit to how short the termination is partly determined by the size of the tube and the rate of light beam expansion produced by diffraction as shown in FIG. 4 at 107. If the metal tube is larger in diameter, then it would be less effective in a shorter length. If the metal tube is substantially smaller, then it would directly reflect light into the outer cores. However, for some applications, a return loss of −70 dB is adequate, and a metal protective tube is advantageous for protecting the structure.

The same approach was used with a glass tube rather than a metal tube. The return loss in this case was generally less than −60 dB. But it was observed that dirt or a nearby surface outside the glass tube or at its end increased the reflection into the core and the return loss. The inventors discovered that devices made using a larger metal tube than that described above produce return loss values typically higher, between −60 and −70 dB, especially for the central core. Unexpectedly, the inventors found that making the metal tube smaller increases the light interaction with the metal, and as a result, the smaller volume device produces better return loss with the added benefit of a smaller termination volume.

As with the first example embodiment, the maximum length and maximum transverse dimension of the termination structure were set by the example, non-limiting application requirements to be 5 mm and 325 um respectively, but the termination structures actually made were much smaller, occupying only approximately 0.0895 $mm^3$. The minimum length and transverse dimension values are set depending on the return loss on metal absorption rate, beam divergence, and end reflection. As explained above, the termination structure must be big enough to contain a diffused region for the entire set of fiber cores, but in this example embodiment, the metal tube size may also be limited by practical constraints, like how small and thin wall a substantially cylindrical metal tube can be made and processed.

The metal tube placed over the end of the structure may be added by a different process or it may be formed in place. That is, metal might be deposited, sputtered, melted on, or added on the outside surfaces of the termination structure after the glass is processed. Deposited metal material still constitutes a metal absorbing tube at a grazing angle and may also conform to a taper and therefore be tapered itself while still providing a grazing angle absorber in the absorption region. The addition of a metal tube in this way means that steps S6 and S7 from the above described process would be combined.

By using a termination material closely index-matched to the optical fiber core in the test example, a single heat process with a flat cleaved fiber end formed an adequate diffusion region to produce a low reflection. The diffusion region is an important characteristic in this example embodiment. Calculations made by the inventors predicted that a direct contact between this test optical fiber (measured effective mode index 1.4782) and the termination material (index 1.448) without any diffusion would produce a return loss of −39 dB. But a Luna OBR measurement shows that the reflection at the fiber-termination interface is generally less than −80 dB using a single heat process. At this level, the reflections from the glass-to-epoxy interface and from the epoxy-to-air interface generally dominate the overall return loss.

In the second example embodiment shown in FIG. 8, there might be advantage to creating the taper with an asymmetric motion where one fiber is pulled slightly to the side. This might produce a geometry that further aids in reducing the back reflection into the optical fiber.

After the fiber is separated in the first example embodiment in FIG. 7, a metal tube may be added to the termination structure as in the second example embodiment in FIG. 8. Thus, the two example embodiments may be merged together as well as manufactured using a single process with improved performance.

Additionally, in both example embodiments shown in FIGS. 7 and 8, there may be an advantage to ensuring that the most distal surface is at an angle of five degrees or more such that any specular reflection from that most distal surface does not travel directly into an optical core.

Another example embodiment coats the surface of the absorptive glass with a light absorbing coating, for example, carbon black or black rubber. Loctite 380 with Black Max® was tested as an example. With Black Max® applied directly to the end of an optical fiber, back reflections too large for the required return loss were observed. However, applying Black Max® to the outer surface of the absorptive glass that is approximately 2 mm long helps eliminate light without increasing reflections. Adding the same Black Max® material to the end of the optical fiber termination was found to reduce the residual reflection for this embodiment as well.

While light-absorptive glass is referred to in the first example embodiment, other dielectric materials may be used which have suitable light absorption properties and can achieved the desired attachment properties. Although stainless steel works well as a light-absorbing metal tube in the second example embodiment, other light-absorbing metals can be used. In addition, the type of index-matching epoxy may be chosen to meet the requirements of a particular application.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical fiber termination provided at an end of an optical fiber including one or more cores, comprising: a structure having a volume including an absorptive region of absorptive material provided to the end of the optical fiber that absorbs light emitted from each of the one or more cores to reduce reflections into the one or more cores to a return loss of −70 dB or less, wherein a length of the structure is less than 5 mm and a largest transverse dimension of the structure is less than 325 um, wherein the loss remains −70 dB or less, wherein the structure includes a material diffusion region formed from heating the end of the optical fiber together with a proximal portion of the absorptive region abutting the end of the optical fiber, a cross-section of the diffusion region including the absorptive material and a material of the optical fiber, wherein the optical fiber is associated with a first index of refraction and the absorptive region is associated with a second index of refraction, and wherein the diffusion region gradually transitions between the first index of refraction and the second index of refraction.

2. The optical fiber termination in claim 1, wherein the structure has cylindrical symmetry and the volume is greater than 0.001 mm³ and less than 0.415 mm³.

3. The optical fiber termination in claim 1, wherein the structure has a cylindrical shape with a length of 3 mm or less and a radius of 100 μm or less.

4. The optical fiber termination in claim 1, wherein there is a mismatch between the first index of refraction and the second index of refraction and the diffusion region gradually transitions between the first index of refraction and the second index of refraction to reduce reflections that occur from the mismatch.

5. The optical fiber termination in claim 1, wherein the absorptive material absorbs light emitted from the one or more cores so that any light escaping the absorptive region and reflected by an exterior surface into the one or more cores results in a return loss less than −70 dB.

6. The optical fiber termination in claim 1, wherein the absorptive material is borosilicate glass, cobalt-doped blue borosilicate glass, or chromium-doped glass.

7. The optical fiber termination in claim 1, wherein the absorptive region includes a light-absorptive tube.

8. The optical fiber termination in claim 7, wherein the light-absorptive tube is metal.

9. The optical fiber termination in claim 7, wherein material of the absorptive region includes a coreless optical fiber at least partially encompassed by the light-absorptive tube, the coreless optical fiber diffuses at a proximal end with the end of the optical fiber, and the coreless optical fiber tapers at a distal end away from the end of the optical fiber.

10. The optical fiber termination in claim 9, wherein the light-absorptive tube contains epoxy along with the coreless optical fiber.

11. The optical fiber termination in claim 10, wherein the epoxy absorbs light.

12. The optical fiber termination in claim 1, wherein the optical fiber includes multiple cores, and wherein the structure reduces cross-coupling between terminations of the multiple cores to less than −70 dB.

13. The optical fiber termination in claim 1, wherein one or more cores are off-center in the fiber structure.

14. A method for terminating an optical fiber including one or more cores, comprising the steps of: providing to the end of the optical fiber an optical fiber termination including light-absorptive material, and heating a portion of the light-absorptive material to form a material diffused region so that the optical fiber termination absorbs light emitted from each of the one or more cores to reduce reflections into the one or more cores to a return loss of −70 dB or less, a cross-section of the diffusion region including the absorptive material and a material of the optical fiber, wherein a length of the optical fiber termination is less than 5 mm and a largest transverse dimension of the optical fiber termination is less than 325 um, wherein the optical fiber is associated with a first index of refraction and the absorptive region is associated with a second index of refraction, and wherein the diffusion region gradually transitions between the first index of refraction and the second index of refraction.

15. The method in claim 14, further comprising heating a portion of the light-absorptive material multiple times.

16. The method in claim 14, wherein the heating includes heating the end of each of the one or more cores so that each core radially expands to the point where light exiting the radially-expanded core has a return loss less than −70 dB.

17. The method in claim 14, wherein the light-absorptive material includes a tube surrounding a coreless optical fiber.

18. The method in claim 17, wherein the heating diffuses a proximal end of the coreless optical fiber with the end of the optical fiber, the method further comprising terminating the coreless optical fiber as a taper at a distal end away from the end of the optical fiber.

19. The method in claim 18, further comprising including index matching epoxy in a distal end of the light-absorptive tube.

20. The method in claim 15, wherein the volume of the optical fiber termination is less than 0.415 mm³ and the termination is cylindrically symmetrical.

21. The method in claim 15, wherein the optical fiber termination has a cylindrical shape having a length of 3 mm or less and a radius of 100 μm or less.

22. The method in claim 15, wherein the light-absorptive material absorbs light emitted from the one or more cores so any light escaping the absorptive region and reflected by an exterior surface into the one or more cores results in a return loss than −70 dB.

23. The method in claim 16, wherein the light-absorptive material is borosilicate glass, cobalt-doped blue borosilicate glass, or chromium-doped glass.

24. The method in claim 16, wherein the optical fiber includes multiple cores, and wherein the optical fiber termination reduces cross-coupling between terminations of the multiple cores to less than −70 dB.

25. The method in claim 16, wherein one or more cores are off-center in the fiber structure.

* * * * *